United States Patent Office 3,492,869
Patented Feb. 3, 1970

3,492,869
MEANS OF MEASURING SURFACE TEMPERA-
TURE BY REFLECTION
Hiromichi Toyota, 58 Ichigaya Yakuoji, Shinjuku-ku, and
Katsuju Kubota, 17 Tamagawa Todoroki, 2-chome,
Setagaya-ku, both of Tokyo, Japan
Filed Sept. 1, 1967, Ser. No. 665,122
Claims priority, application Japan, Sept. 3, 1966,
41/58,113
Int. Cl. G01j 5/52, 5/62
U.S. Cl. 73—355                                    7 Claims

ABSTRACT OF THE DISCLOSURE

An apparatus for measuring the surface temperature of an object which generally includes a reference heater, an emissivity adjusting device mounted between the heater and the body, and a heat sensor disposed for receiving radiation from the heater and from the surface of the object. If the emissivity of the radiation directed toward the object from the heater is adjusted to a predetermined value, and the radiation which is incident directly upon the sensor from the reference heater is made equal to the sum of the radiation emitted from the reference heater through the emissivity adjusting device and reflected by the surface to the heat sensor and the radiation emitted from the surface directly to the heat sensor, the surface temperature of the object will be equal to the temperature of the heater. A temperature indicator connected to the heater provides a readout of the surface temperature of the object accordingly.

BACKGROUND OF THE INVENTION

Field of the invention

This invention relates generally to a temperature measuring apparatus and more particularly to an apparatus which utilizes the reflective properties of a surface to measure the temperature of such a surface.

Description of the prior art

Those thermometers which operate in response to heat radiation, such as radiation pyrometers, optical pyrometers, etc., are calibrated for accuracy by means of black bodies. In the measurement of a body that is not black, however, such thermometers are capable of measuring the correct surface temperature only if compensation is made for the emissive or reflective properties of the particular surface.

Accordingly, various types of surface temperature measuring methods have evolved which overcome the difficulty of compensating for surface emissivity and reflection capability. One known method which eliminates the difficulty is that in which heat is radiated from a black body radiator to the surface under examination to obtain the sum of the reflected energy therefrom and the direct radiation from that surface. This sum is compared with the direct radiation from the black body radiator and any difference between such values is eliminated by altering the temperature of the radiator. According to this method, however, a considerable number of difficulties are presented.

One of the difficulties encountered by the above-described surface measuring apparatus is that the black body radiator requires adjustment of the temperature thereof. In addition, the sum of the emissivity and the reflection ratio of the measuring surface must be equal to unity. Furthermore, the surface under examination must be a perfect mirror-like reflector. These prerequisites of the above-described method for measuring the temperature of a surface restrict the applicability of such a method and reduce its practicality. Another serious disadvantage results from the use of the above-described method in that a relatively large error results from the measurement of low emissivity surfaces such as those of aluminum and brass.

SUMMARY OF THE INVENTION

Accordingly, it is an object of the present invention to provide a surface temperature measuring apparatus which is capable of measuring the surface temperature of bodies of varied emissive, reflective and surface properties without requiring compensation for the emissivity of the surface under examination.

Another object of the present invention is to provide a surface temperature measuring apparatus which does not require compensation for the emissive or reflective properties of a surface under examination without the use of a black body as a reference temperature radiator.

Still another object of the present invention is to provide a surface temperature measuring apparatus which is not restricted to conditions requiring the sum of the emissivity and the reflectability of the measuring surface to be equal to unity.

It is still another object of the present invention to provide a surface temperature measuring apparatus wherein the surface under examination need not be a perfect mirror-like reflector.

Still another object of the present invention is to provide a surface temperature measuring apparatus which is capable of measuring the temperature of low emissivity surfaces, such as those of aluminum and brass, without any error existing in the resulting measurement.

These and other objects of the present invention are generally realized by the provision of a reference heater having at least two heat radiating surfaces, with each surface having a different value of emissivity, a heat sensor positioned for receiving heat radiation directly from one surface of the reference heater and from the other surface of the heater after reflection thereof from the surface under examination and also positioned for receiving radiation directly from the surface under examination, means for varying the temperature of the heater, and a temperature sensing device connected to the heater.

A specific feature of the present invention resides in the provision of an emissivity adjuster disposed between the reference heater and the surface under examination for altering the value of the effective emissivity of the heater surface.

Another feature of the present invention resides in the provision of means for alternately applying heat radiation from the reference heater to the heat sensor and the combined heat radiation from the heater which is reflected from the surface under examination and the heat radiation originating from the surface under examination to the heat sensor. A phase discriminator is employed which is responsive to the means for alternately applying theh respective radiations to the heat sensor and responsive to the output of the heat sensor for determining which one of the alternately applied radiations is of a greater value.

Another feature of the present invention resides in the provision of a deviation indicator responsive to an output of the phase discriminator for controlling the temperature of the reference heater.

These and other objects, features and advantages of the present invention will be more fully realized and understood from the following detailed description when taken in conjunction with the accompanying drawings wherein:

BRIEF DESCRIPTION OF THE DRAWINGS

Like reference numerals employed throughout the various views of the drawings are intended to designate the same or similar elements.

DESCRIPTION OF THE PREFERRED EMBODIMENT

Figure 1:
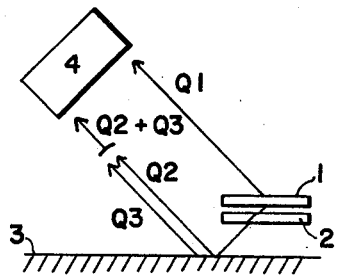
FIG. 1 is a diagrammatic illustration of an arrangement of components which form a part of the present invention which illustrates the respective radiations associated with such structure.

With particular reference to FIG. 1, a sufficient portion of the present invention is illustrated to permit understanding of the principles employed in obtaining a measurement of the temperature of a surface. As shown in FIG. 1, a reference heater or heat source 1 for producing thermal radiation is positioned a predetermined distance from a surface 3, the temperature of which is to be measured. Heat or thermal radiation is radiated from a lower surface of the reference heater 1 to the surface 3 in order to obtain a reflection from the surface 3 as indicated by the arrow in FIG. 1 designated $Q_2$. Heat is also radiated from an upper surface of the reference heater 1 as indicated by the arrow designated $Q_1$. In addition, radiation which originates from the surface 3 is shown by the arrow designated $Q_3$.

Disposed between the reference heater 1 and the surface 3 is an emissivity adjusting device 2 for adjusting the effective emissivity of the lower surface of the reference heater 1 to a predetermined value relative to the value of the emissivity of the upper surface of the heater 1. Consequently, the radiation $Q_2$ is modified in accordance with the change in the emissivity of the lower surface of the heater 1 effected by the emissivity adjusting device 2. A heat or thermal radiation sensor 4 is positioned to receive each of the radiations $Q_1$, $Q_2$ and $Q_3$.

The ratio of the equivalent effective emissivity values of both surfaces of the reference heater 1 is adjustable by means of the emissivity adjusting device 2. The value of this ratio may be established by means of a standard and once the value of this ratio is established, it remains fixed. When the emissivity adjusting device 2 is properly adjusted to the predetermined value of the ratio, the correct surface temperatures of various matters possessing different surface emissivity or reflection values can be measured without ascertaining the values of the surface emissivity or reflection capabilities. When the correct ratio of the equivalent effective emissivity values of both surfaces of the reference heater 1 is established, the temperature of the reference heater 1 is adjusted to establish the following relationship:

$$Q_1 = Q_2 + Q_3 \qquad (1)$$

wherein $Q_1$ is the effective radiation directly incident upon the heat sensor 4 from the reference heater 1;

$Q_2$ is the effective radiation emitted from the reference heater 1 which passes through the emissivity adjusting device 2, is reflected by the surface 3, and then received by the heat sensor 4; and $Q_3$ is the effective radiation directly incident upon the heat sensor 4 from the surface 3.

Each of the radiation quantities expressed in Equation 1 can be approximately expressed as follows:

$$Q_1 = \epsilon_1 T_1^n \qquad (2)$$

$$Q_2 = \epsilon_2 r_3 T_1^n \qquad (3)$$

$$Q_3 = \epsilon_3 T_3^n \qquad (4)$$

wherein $\epsilon_1$ is the effective emissivity of the upper surface of the reference heater 1 which emits the heat radiation $Q_1$ directly toward the heat sensor 4;

$\epsilon_2$ is the equivalent effective emissivity of the lower surface of the reference heater 1 as modified by the emissivity adjusting device 2 and which transmits the radiation quantity $Q_2$;

$\epsilon_3$ is the effective emissivity of the surface 3 which radiates the quantity $Q_3$;

$T_1$ is the temperature of the reference heater 1 in degrees Kelvin;

$T_3$ is the temperature of the surface 3 in degrees Kelvin;

$r_3$ is the effective reflection capability or ratio of the surface 3; and $n$ is equal to 4 when the entire radiation band is utilized. However, since the spectrum sensitivity of the heat sensor 4 is limited to a predetermined wave length band, the value of $n$ is much larger than 4.

From Equations 1, 2, 3 and 4, the following relationship is derived:

$$\epsilon_1 T_1^n = \epsilon_2 r_3 T_1^n + \epsilon_3 T_3^n \qquad (5)$$

which is simplified to the following expression:

$$\frac{(T_3)^n}{(T_1)^n} = \frac{\epsilon_1 - \epsilon_2 r_3}{\epsilon_3} \qquad (6)$$

When the right side of Equation 6 is equal to the value 1, $T_1$ is equal to $T_3$. Therefore, the value of $T_3$ is obtained by measuring the value of $T_1$.

When the value 1 is subtracted from both sides of Equation 6, the following relationship is obtained:

$$\frac{(T_3)^n}{(T_1)^n} - 1 = \frac{\epsilon_1 - \epsilon_2 r_3 - \epsilon_3}{\epsilon_3} \qquad (7)$$

When a particular surface is employed as a standard and the temperature values $T_1$ and $T_3$ are made equal, the ratio $\epsilon_2$ to $\epsilon_1$ is established by variation of the emissivity $\epsilon_2$ to make the right side of Equation 7 equal to zero. Consequently, the following relationship is established:

$$\frac{\epsilon_2}{\epsilon_1} = \left(1 - \frac{\epsilon_3}{\epsilon_1}\right) / r_3 \qquad (8)$$

Figure 2:
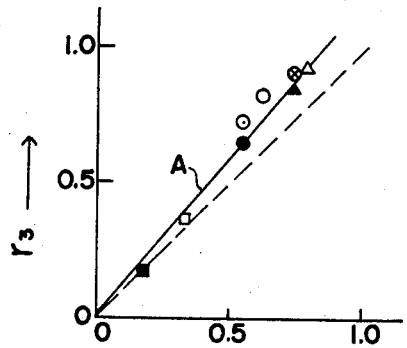
FIG. 2 is a graph of particular properties of the surface under examination and the reference heater forming a part of the present invention.

FIG. 2 is a graph illustrating the results of the measurements carried out by the system of the present invention on various kinds of surfaces under examination to find the relationship between the reflection capability $r_3$ and the value of $$\left(1 - \frac{\epsilon_3}{\epsilon_1}\right)$$

which is obtained by subtracting from the value 1 the ratio of the emissivity $\epsilon_3$ to the emissivity $\epsilon_1$ of the upper surface of the reference heater 1. The reflection values or ratios $r_3$ are represented on the axis of ordinates and the values of the expression $$\left(1 - \frac{\epsilon_3}{\epsilon_1}\right)$$

are represented on the axis of abscissas.

The surfaces under examination are represented in FIG. 2 by individual symbols as follows:

■ represents an iron plate having an oxidized surface;

□ represents a copper plate having an oxidized surface;

⊗ represents an aluminum plate having a roll surface;

● represents a stainless steel plate having a coarse or rough finish;
⊙ represents a stainless steel plate having a satin finish;
○ represents a stainless steel plate having a fine finish;
▲ represents a brass plate with a coarse finish; and
△ represents a brass plate having a fine finish.

With reference to FIG. 2 it is apparent that the inverse of the slope of the straight line A is represented on the right hand side of Equation 8. Assuming that the inverse of this slope is equal to a value C, such value of C is smaller than unity and is constant irrespective of the emissivity $\epsilon_3$ and the reflection ratio $r_3$. Consequently, the following relationship exists:

$$\epsilon_2/\epsilon_1 = C \qquad (9)$$

By suitable setting of the emissivity adjusting device 2, the effective emissivity $\epsilon_2$ of the lower surface of reference heater 1 is adjusted to make the value of its ratio to the effective emissivity $\epsilon_1$ of the upper surface of the heater 1 equal to C. With the emissivity $\epsilon_2$ adjusted and set in this manner, the surface temperature $T_3$ can be accurately measured by ascertaining the temperature $T_1$ without regard to the particular material, the mechanical process state, the effective emissivity, and the effective reflection capabilities of the object under examination. Since the values of $\epsilon_1$ and $\epsilon_2$ need not be equal to unity respectively and since it is only necessary to establish the ratio $\epsilon_2$ to $\epsilon_1$ at a suitable value smaller than unity, the above described principle can be readily embodied into a surface measuring device.

Figure 3:
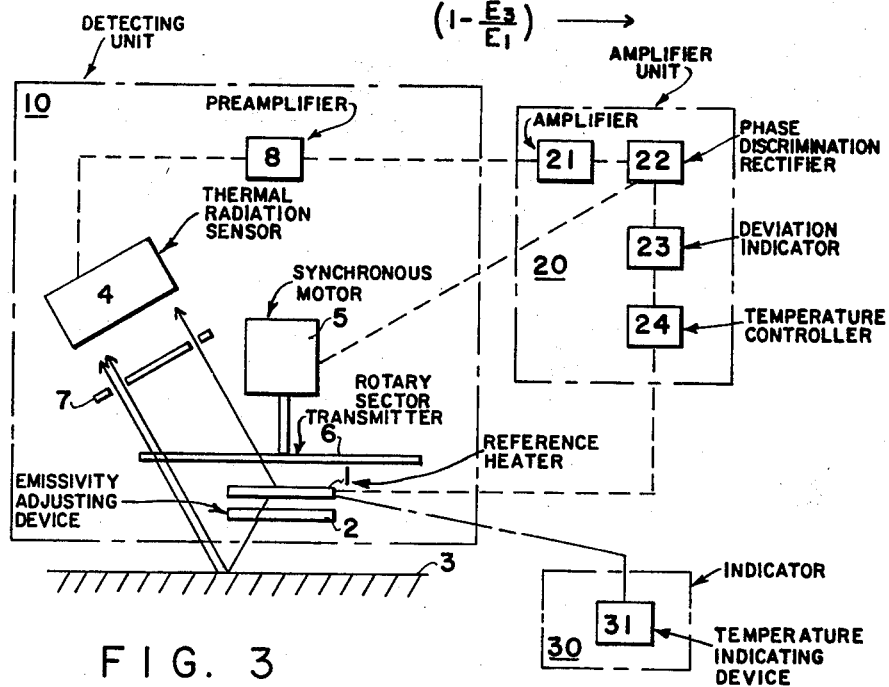
FIG. 3 is a diagrammatic illustration of a surface temperature measuring apparatus constructed in accordance with the principles of the present invention.

FIG. 3 illustrates the preferred exemplification of the present invention which employs the above-described principles explained in connection with FIGS. 1 and 2 of the drawings. As shown in FIG. 3, the system is formed of a detecting unit 10, amplifier unit 20 and an indicator 30. The detecting unit 10 is positioned at a suitable distance from the surface 3.

Disposed within the detecting unit 10 is the temperature adjustable reference heater 1 which is mounted in the same relationship with respect to the emissivity adjusting device 2, the surface 3 and the heat sensor 4 as the same elements are positioned in FIG. 1. That is, the heater 1 is positioned for radiating heat from an upper surface thereof directly to the heat sensor 4 and from a lower surface thereof through the emissivity adjusting device 2 to the surface 3, where such radiation is reflected to the heat sensor.

The reference heater 1 may be fabricated from a metal plate, such as Microme or Kanthal, or by applying a conductive coating material to a metal ribbon or glass. Heat is generated by applying a conductive coating material to a metal ribbon or glass. Heat is generated by applying an electric current directly thereto, or by applying heat to a metal plate. Disposed immediately below the reference heater 1 is the emissivity adjusting device 2 which is adjustable to cover a part of or the whole lower surface of the reference heater 1. The emissivity adjusting device serves to alter the amount of radiation from the lower surface of the reference heater 1 which results in adjustment of the apparent emissivity thereof. The emissivity adjusting device 2 may, for example, be a filter, a slit or a film made of an emissivity changing paint, etc.

A rotary sector or disk 6 which is mounted on the output shaft of a synchronous motor 5 for rotation is positioned above the reference heater 1 such that the radiations $Q_1$, $Q_2$ and $Q_3$ pass therethrough to the heat sensor 4. By means of the rotary sector 6, the radiation quantity $Q_1$ and a composite of the radiation quantities $Q_2$ and of $Q_3$ are alternately applied to the heat sensor 4. The alternate transmission of the respective radiation quantities through the rotor sector 6 may be effected by means of a first plurality of apertures circumferentially spaced adjacent the outer periphery of the rotary sector 6 through which the radiation quantities $Q_2$ and $Q_3$ are transmitted and a second plurality of apertures circumferentially spaced from one another and located inwardly from the first plurality of apertures on the rotary sector 6 for transmitting the radiation quantity $Q_1$ therethrough. By circumferentially spacing each aperture of one set of apertures intermediate a respective pair of apertures of the other set of apertures, the composite of radiation quantities $Q_2$ and $Q_3$ will be transmitted through the rotary sector 6 during one time period and the radiation quantity $Q_1$ will be transmitted therethrough during a subsequent time period to the heat sensor 4.

The heat sensor 4 may be formed of a lead sulphide photoconductive cell or an indium-antimonide photoconductive cell or the like heat responsive transducer.

Positioned adjacent the input of the heat sensor 4 is an adjustable slit device 7 which is employed for adjusting the intensity of the radiation passing therethrough. An output of the heat sensor 4 is amplified by a preamplifier 8 and applied to an input of the amplifier 20. In order to insure normal operation and to prevent any hinderance to the operations of any of the other components, the synchronous motor 5, the rotary sector 6, the heat sensor 4, the slit device 7 and the preamplifier 8 must be kept cooled.

The amplifier unit 20 generally includes an amplifier 21 which amplifies a signal received from the preamplifier 8 to a desired level, a phase discrimination rectifier 22 which is responsive to a signal from the amplifier 21 and a signal from the synchronous motor 5 to provide at an output thereof a signal which represents the difference in magnitude between the radiation quantity $Q_1$ and the composite of the radiation quantities $Q_2$ and $Q_3$. Connected to an output of the phase discriminator 22 is a deviation indicator 23 which indicates the value of the signal obtained at the output of the phase discriminator 22. A temperature controller 24 is also responsive to an output of the phase discriminator 22 and performs to adjust the temperature of the reference heater 1 of the detecting element 10 to a point at which the radiation quantity $Q_1$ is equal to the composite of the radiation quantities $Q_2$ and $Q_3$.

The indicator 30 is provided with an indicating device 31, such as an indicator or a recording meter which indicates the temperature of the reference heater 1. The temperature indicating device 31 may include a thermocouple or a temperature measuring resistor of relatively small heat capacity mounted on or within the reference heater 1.

The initial setup or calibration of the apparatus illustrated in FIG. 3 is accomplished by utilizing a standard or a calibration plate of, for example, brass, in which a thermocouple or a temperature measuring resistor of small heat capacity is mounted. The calibration plate is mounted at the same position which the surface 3 occupies in FIGS. 1 and 3 with respect to the reference heater 1 and heat sensor 4 and is heated to a desired measuring temperature, for instance, about 500° K., and then the temperature $T_3$ is measured. The temperature $T_1$ of the reference heater 1 is adjusted by means of the temperature controller 24 to a point, as indicated by the temperature indicator 31, at which it is equal to the temperature $T_3$. The emissivity adjusting device 2 is then adjusted to a point at which the deviation indicator 23 indicates a zero or null. As is apparent from FIG. 2, better accuracy is obtainable when the calibration is performed with a calibration plate or surface having a relatively large reflection capability $r_3$ for establishing the value of C of Equation 9. Therefore, it is advantageous to employ a brass or aluminum plate for the calibration surface.

Thus, by measuring the temperature $T_1$, a surface thermometer that has been calibrated in this manner obviates the necessity of making separate adjustments for measuring the temperatures $T_3$ of various measuring surfaces of different emissivity values.

Figure 4:
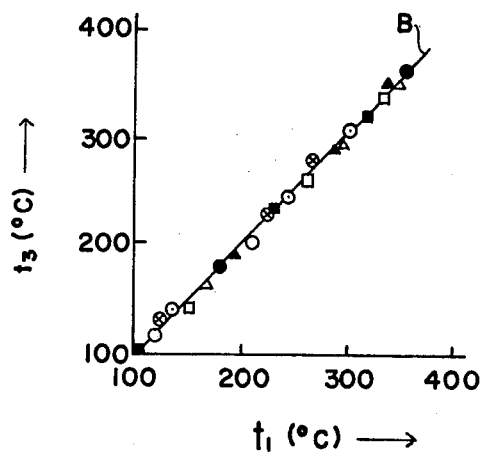
FIG. 4 is a graph of the results of measurements obtained by means of the surface temperature measuring apparatus illustrated in FIG. 3.
Figure 5:
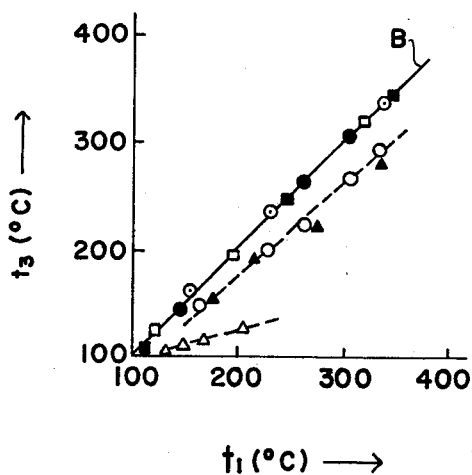
FIG. 5 is a graph of the results of the measurements obtained from a surface temperature measuring apparatus known in the prior art.

FIG. 4 is a graph which illustrates one example of the results of an experimental measurement which was performed by the above described method and structure. As shown in FIG. 4, the surface temperatures $t_3$ of surfaces under examination are represented on the axis of ordinates in degrees centigrade and the temperature $t_1$ of the reference heater 1 is represented on the axis of abscissas in degrees centigrade. In the particular exemplified experiment, the surface temperature $t_3$ of each surface or object under examination was measured in the same manner as the calibration procedure described in the foregoing. As is apparent from FIG. 4, the temperatures $t_1$ and $t_3$ of various materials under examination varied only slightly from a straight line designated B. The symbols of both FIGS. 4 and 5 are identical to those symbols employed in FIG. 2 and explained in the foregoing description. It is readily apparent that all of the points on the line B are representative of the condition $t_1 = t_3$.

The graph of FIG. 5 illustrates the results of an experiment which was conducted with a surface temperature measuring system well known in the prior art which utilizes reflective properties of a material for effecting the temperature measurement. With reference to FIG. 5, the surface temperatures $t_3$ of the object under examination is represented on the axis of ordinates and the temperature $t_1$ of the reference heater 1 is represented on the axis of abscissas. It is readily apparent that the temperature measurements taken from a brass plate having a coarser finish and a stanless steel plate having a fine finish deviated considerably from the straight line B. The temperature measurements taken of a brass plate having a fine finish deviated considerably more from the straight line B while the measurement for an aluminum plate was impossible due to unstable conditions.

The present invention has particular applicability in the surface temperature measurement of objects such as thin iron strips which have baked thereon various color coatings. The temperatures of such iron strips or other objects under examination can be measured while such objects are travelling or moving between stations in a processing machine. Because of the diverse colors employed, emissivity from the surface of such objects varies over a wide range. For instance, the surface temperature range of such iron strips provided with various color coatings is in the neighborhood of 220° C. to 280° C.

It can be readily appreciated from the above described apparatus that the device of the present invention is an accurate surface thermometer wherein the calibration thereof need be performed only once for measuring the surface temperatures of a wide variety of objects of various materials and surface conditions and that the necessity of correcting or compensating for emissivity values is obviated.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawings shall be interpreted as illustrative and not in a limiting sense.

What is claimed is:

1. An apparatus for measuring the surface of an object comprising
    (a) a reference thermal radiation source having two radiation outputs of different value, each of said outputs being proportional to the temperature of said source, said source being positioned for irradiating a surface of the object with a first one of the radiation outputs,
    (b) thermal radiation sensor means positioned to receive a first radiation quantity formed of a second one of the radiation outputs and to receive a second radiation quantity formed of said first radiation output reflected from the surface of the object and a radiation quantity originating from the object, including means for sensing a difference between said first radiation quantity and said second radiation quantity, wherein the ratio of said first one of the radiation outputs to said second one of the radiation outputs is equal to the constant value of the quantity $$\left(1 - \frac{\epsilon_3}{\epsilon_1}\right)/r_3$$

wherein,
      $\epsilon_3$ = the emissivity of the surface of the object,
      $\epsilon_1$ = the emissivity of the surface of said source from which said second radiation output originates, and
      $r_3$ = reflection factor of the surface of the object,
    (c) means responsive to said sensing means for varying the temperature of said source, and
    (d) means for sensing the temperature of said source.

2. An apparatus as defined in claim 1, wherein said reference thermal radiation source includes a thermal radiation element having two radiating surfaces and an emissivity adjusting device disposed adjacent one of the surfaces of said thermal radiation element, said first radiation output being formed of the radiation originating at said thermal radiation element and passing through said adjusting device, said second radiation output being formed entirely of radiation originating at said thermal radiation element.

3. An apparatus as defined in claim 1, wherein said heat sensor means includes a thermal radiation sensor element and means for alternately transmitting said first radiation quantity and then said second radiation quantity to said thermal radiation sensor element, and wherein said temperature varying means includes a phase discriminator connected to an output of said sensor element and responsive to said transmitting means, means connected to an output of said phase discriminator for indicating the difference between said first radiation quantity and said second radiation quantity, and a temperature controller connected to an output of said indicating means and to said thermal radiation sensor element.

4. An apparatus as defined in claim 1, wherein said sensing means includes a thermal radiation transducer mounted on said thermal radiation source and a temperature indicator connected to said transducer.

5. A method of measuring the surface temperature of an object, comprising
    (a) irradiating a surface of the object with a first radiation quantity from a body, said quantity being derived from and directly related to the temperature of said body,
    (b) adjusting the value of said first radiation quantity such that the ratio of the value of said first radiation quantity reflected from the surface to the radiation originating from the object is equal to the product of a predetermined constant and the reflection factor of the surface, said product being equal to the expression $$1 - \frac{\epsilon_3}{K}$$

wherein K is a constant and $\epsilon_3$ is the emissivity of the surface; and
    (c) measuring the temperature of said body.

6. An apparatus for measuring the surface temperature of an object comprising
    (a) means for irradiating a surface of the object with a first radiation quantity from a body, said quantity being derived from and directly related to the temperature of said body,
    (b) means for adjusting the value of said first radiation quantity such that the ratio of the value of said first radiation quantity reflected from the surface of the object to the radiation originating from the object is equal to the product of a predetermined constant and the reflection factor of the surface, including means for sensing the radiation, said product being equal to the expression $$1-\frac{\epsilon_3}{K}$$

wherein K is a constant and $\epsilon_3$ is the emissivity of the surface; and (c) means for measuring the temperature of said body.

7. An apparatus for measuring the surface temperature of an object, comprising
  (a) a thermal radiation source having two thermal radiation radiating surfaces,
  (b) an emissivity adjuster mounted between one radiating surface of said thermal radiation source and a surface of the object,
  (c) a thermal radiation sensor,
  (d) means for alternately transmitting in a first time period radiation from the other radiating surface of said source to said sensor and in a second time period the composite of the radiation from the one surface of said source passing through said emissivity adjuster and reflected by the surface of the object and the radiation originating from the surface of the object,
  (e) a phase discriminator connected to an output of said thermal radiation sensor and responsive to said transmitting means,
  (f) a temperature controller connected to an output of said phase discriminator and to said thermal radiation source, and
  (g) a temperature indicator connected to said thermal radiation source.

References Cited
UNITED STATES PATENTS

| | | |
|---|---|---|
| 2,737,809 | 3/1956 | Fastie. |
| 2,846,882 | 8/1958 | Gray. |
| 2,978,589 | 4/1961 | Howell. |

LOUIS R. PRINCE, Primary Examiner

F. SHOON, Assistant Examiner